United States Patent [19]

Mann, Jr. et al.

[11] 4,337,079
[45] Jun. 29, 1982

[54] LOW POLYPHOSPHATE SUSPENSION FERTILIZERS FROM WET-PROCESS ACID

[75] Inventors: Horace C. Mann, Jr., Killen; Robert S. Meline, Florence, both of Ala.

[73] Assignee: Tennessee Valley Authority, Muscle Shoals, Ala.

[21] Appl. No.: 264,922

[22] Filed: May 18, 1981

Related U.S. Application Data

[63] Continuation-in-part of Ser. No. 194,642, Oct. 6, 1980, now Defensive Publication No. T101,802.

[51] Int. Cl.³ .............................................. C05B 7/00
[52] U.S. Cl. ............................................. 71/34; 71/41; 71/43; 71/64.08; 71/64.13; 423/310; 423/312; 423/313; 134/22.17
[58] Field of Search ......................... 423/310, 312, 313; 71/34, 41–43, 44, 64.08, 64.13; 422/129; 134/22.17

[56] References Cited

U.S. PATENT DOCUMENTS 4,134,750  1/1979  Norton et al. ........................... 71/29
4,210,438  7/1980  Casperson .............................. 71/34
4,211,546  7/1980  Jensen .................................... 71/34

Primary Examiner—S. Leon Bashore, Jr.
Assistant Examiner—Ferris H. Lander
Attorney, Agent, or Firm—Robert A. Petrusek

[57] ABSTRACT

An energy efficient process and apparatus is described that allows production of concentrated polyphosphate containing ammonium phosphate suspension fertilizers that can be stored and handled at temperatures well below 0° F. Ammoniation of the merchant-grade wet-process phosphoric acid provides all of the heat required by the process. Use of a unique enlarged dual pipe-type reactor system allows operation for extended periods without clogging. To obtain the high concentration and excellent low temperature storage and handling properties, the ammonium phosphate must be produced within closely specified and previously undisclosed N:$P_2O_5$ and solution concentration ranges. Operation outside the specified composition range will reduce the maximum plant food concentration and may cause some of the ammonium phosphate salts to crystallize and foul the heat-transfer surfaces.

9 Claims, 5 Drawing Figures

AMMONIUM POLYPHOSPHATE SUSPENSION FERTILIZER FROM MERCHANT-GRADE WET-PROCESS ACID

AMMONIUM POLYPHOSPHATE SUSPENSION FERTILIZER FROM MERCHANT-GRADE WET-PROCESS ACID

EQUATION TO PREDICT PRESENCE OF CRYSTALS IN APP SUSPENSIONS

DUAL PIPE REACTOR SYSTEM-PIPING ARRANGEMENT FOR DISSOLVING SOLIDS CLOGGING PIPE REACTOR WITH AQUA AMMONIA

DUAL PIPE REACTOR SYSTEM - PIPING ARRANGEMENT FOR
DISSOLVING SOLIDS CLOGGING PIPE REACTOR WITH FEED ACIDS

LOW POLYPHOSPHATE SUSPENSION FERTILIZERS FROM WET-PROCESS ACID

The invention herein described may be manufactured and used by or for the Government for governmental purposes without the payment to us of any royalty therefor.

This application is a continuation-in-part of application Ser. No. 194,642, filed Oct. 6, 1980, for Low Polyphosphate Suspension Fertilizers from Wet-Process Acid, now U.S. Defensive Publication T101,802, 5/4/82.

Our invention relates to a process for the production of ammonium polyphosphate suspensions made from impure wet-process phosphoric acids. More particularly it relates to a new and improved method for production of ammonium polyphosphate suspensions that contain only enough polyphosphate to provide the suspension with acceptable low temperature storage characteristics that heretofore has not been possible with suspensions made entirely and directly from orthophosphoric acid. Still more particularly our invention is carried out in a unique apparatus which allows such efficient utilization of the chemical heat generated therein that it is not necessary to remove a portion of the free water from the merchant-grade wet-process acid prior to formation of the polyphosphate and no extra or external heat is required to produce a concentrated ammonium polyphosphate suspension with a composition of matter within predetermined limits which has acceptable low temperature storage characteristics heretofore not possible with a suspension made entirely and directly from orthophosphoric acid.

Fluid fertilizers having compositions similar to those of standard dry mixed fertilizers are well known in the industry and are increasing in popularity. Such fluids have the advantages over dry mixed fertilizers in that costs of evaporating water and bagging are eliminated and application to the soil is greatly simplified. Moreover, the use of fluid fertilizers eliminates difficulty due to segregation and caking often encountered in the storing of dry fertilizers.

The art of producing fluid fertilizers, both liquids and suspensions, is well known and fully described in the literature. See, for examples, the following U.S. Pat. Nos. 2,950,961, Striplin et al, Aug. 30, 1960; 3,015,552, Striplin et al, Jan. 2, 1962; 3,109,729, Slack et al, Nov. 5, 1962; 3,113,858, Slack et al, Dec. 10, 1963; 3,326,666, Walters, June 20, 1967; 3,096,170, Newsome, July 2, 1963; 3,234,004, Smith et al, Feb. 9, 1966; 3,148,970, Smith et al, Sept. 15, 1964; 3,697,247, Jones et al, Oct. 10, 1972; 3,382,059, Getsinger, May 7, 1968; 3,192,013, Young, June 29, 1965; 3,813,233, Kendrick, May 28, 1974; 3,697,247, Jones and Frazier, Oct. 10, 1972; and 3,066,432, Jones, Jan. 3, 1978.

The most common method of producing both liquid and suspension fertilizers containing nitrogen and phosphate is by ammoniation of phosphoric acids. In the early 1950's electric furnace orthophosphoric acid, which is relatively free of impurities, was ammoniated to form 8-24-0 grade liquid fertilizer.

However, liquid fertilizers that contain all of their phosphorus values as the ortho form of the numerous acyclic species have some outstanding disadvantages. The solutions are limited to a maximum plant food content of about 33 percent by weight because experience has taught that concentration in excess of this amount always has resulted in crystallization and precipitation of soluble salts. Furthermore, liquids that contain all of their phosphorus values as the ortho form of the numerous acyclic species derived from phosphoric acid of the wet-process type contain precipitated metallic impurities originally present in said wet-process phosphoric acid. These disadvantages, in many instances, outweighed the benefits derived by elimination of the evaporation and bagging steps associated with solid fertilizers.

In a fairly recent breakthrough in overcoming the disadvantages of liquid fertilizers produced by the prior-art methods, there is found in U.S. Pat. No. 3,044,851, D. C. Young, the discovery that if phosphoric acid of the wet-process type containing up to a maximum of about 54 percent $P_2O_5$ is subjected to evaporating means, either at atmospheric or at reduced pressure, so as to condense the wet acid and raise its $P_2O_5$ content up to the range of approximately 60 to 76 percent $P_2O_5$, the formation of metallic precipitates which otherwise render wet-process phosphoric acid unusable for the preparation of liquid mixed fertilizers are substantially sequestered. In addition, there is taught in said patent that if wet-process phosphoric acid is so concentrated, it may then be subsequently ammoniated to form liquid mixed fertilizers in which the metallic impurities originally present in said wet-process phosphoric acid remain sequestered and in solution.

Still another and more recent breakthrough is found in U.S. Pat. No. 3,382,059, Getsinger, wherein he produced liquid fertilizers from orthophosphoric acid of the wet-process type and ammonia and wherein he circumvents or eliminates the separate heating and concentrating step found in the disclosure of Young. In this later work, Getsinger has discovered that by combining orthophosphoric acid of the wet-process type and anhydrous ammonia in a direct method, he is able to utilize the autogenous heat of reaction therein to effect the release of water from such acid whereby same is condensed while it is being ammoniated to form directly, without the separate heating and concentrating step, ammonium polyphosphate solutions. However, as is pointed out by Siegel et al in a subsequent U.S. Pat. No. 3,562,778, unless ammoniation of the orthophosphoric acid of the wet-process type is carried out in a specified manner, unavailable $P_2O_5$ will be formed which not only will precipitate rapidly from the liquid fertilizer true base solution, but which will be essentially unavailable to the growing plant. Meline and Lee (U.S. Pat. No. 3,733,191) were able to overcome the unavailable $P_2O_5$ problem encountered when attempting to use impure wet-process acid in the Getsinger process by incorporating the ammoniation procedure described by Siegel et al using a "T" mixer. Meline and Lee, like Getsinger, encountered a number of problems with foaming which they were able to overcome by incorporation of equipment to separate steam and unreacted ammonia from the "T" mixer product, but this equipment was complicated and expensive to build and maintain. Operation of their process yielded solutions which could be converted into fertilizer suspension. A description of the equipment used by both Getsinger (in U.S. Pat. No. 3,382,059) and Meline et al (in U.S. Pat. No. 3,733,191) showed that both used a scrubber or preneutralizer to capture unreacted ammonia and evaporate a portion of the water from the feed orthophosphoric acid, a reactor or disengager where the polyphosphate was formed, and a third vessel where the molten ammonium polyphosphate was dissolved in water or aqua ammonia to make the liquid fertilizer. A cooler to lower the temperature of the liquid fertilizer to the storage temperature was also incorporated in both processes.

Another possible approach to producing an ammonium polyphosphate liquid fertilizer is described by Ellis et al in U.S. Pat. No. 4,185,075 which details an apparatus for reacting phosphoric acid and ammonia to which water can be added to produce an ammonium polyphosphate product. Although the apparatus is claimed to be a single reactor to eliminate what is claimed to be a viscosity problem inherent in the first stage of a two-stage ammoniation process, a close examination of their single-stage apparatus reveals that they combine both stages into one vessel which must only magnify the problem they were trying to overcome since water is always added in the reaction section of their apparatus to build up pressure and blow their reaction melt from the reaction chamber. In fact, Ellis et al state in several places that steam is needed to build up pressure in the reaction zone to propel the reaction mixture through the reaction zone and to expel the reaction mixture from the reaction zone. Kearns, in U.S. Pat. No. 3,464,808, also indicates that pressure is necessary to expel his reaction melt through the small opening in his jet reactor prior to dissolving the molten ammonium polyphosphate in water to produce a liquid fertilizer. Evidently, although not specifically stated, Ellis et al's apparatus must not be able to function properly unless additional water is fed to the reaction zone.

Thus, although much research has been devoted over the years to producing a liquid fertilizer true base solution from orthophosphoric acid of the wet-process type, none of the processes developed to date have been entirely successful in that the equipment has been complex and difficult to operate and maintain, sometimes must be operated under pressure, and essentially all of the processes required some type of a prereactor to evaporate a portion of the water from the phosphoric acid prior to formation of significant amounts of polyphosphate. The process that comes closest to producing a true solution in simple equipment is Meline's U.S. Pat. No. 3,775,534 in which he uses a "common pipe" in which "all or part of the ammonia" is reacted with the expensive "wet-process superphosphoric acid, i.e., acid containing at least some nonortho species" and this resultant melt is subsequently dissolved in water or aqua ammonia in a solution reaction vessel. Again, this process requires water to be evaporated from the orthophosphoric acid prior to formation of the polyphosphate. This ammonium polyphosphate liquid fertilizer true base solution containing at least about 80 percent of the $P_2O_5$ as polyphosphate is then rapidly cooled to prevent hydrolysis of the polyphosphate. Although not known at the time, the "common pipe" reactor disclosed by Meline had a problem with buildup on the walls of the pipe of the same unavailable $P_2O_5$ described by Siegel et al in U.S. Pat. No. 3,562,778 which eventually caused the pipe reactor to become plugged and caused operations to cease. At the current time the more than one hundred commercial plants using this common pipe reactor have devised a number of ways of cleaning out the pipe reactor after it has become plugged but none have devised a way to prevent the buildup of unavailable $P_2O_5$ from clogging the pipe reactor. Thus, in spite of the best efforts of numerous researchers, the production of a liquid fertilizer true base solution is still difficult, expensive, and not without equipment operating problems.

Since wet-process merchant-grade phosphoric acid costs less per unit of $P_2O_5$ than superphosphoric acids, which contain polyphosphates that sequester impurities, or electric furnace orthophosphoric acids, which contain little or no impurities, the use of merchant-grade acid in preparation of suspension fertilizers has often been attempted. Merchant-grade acid is defined in the 1980 issue of Farm Chemicals Handbook as phosphoric acid containing 51 to 54 percent $P_2O_5$ and less than one percent of suspended solids[a]. However, the grades of the fluid fertilizers produced from such merchant-grade acid have been found to be substantially lower in $P_2O_5$ values than the feed acid because of numerous factors, including impurities which precipitate as amorphous compounds with gel-like characteristics when such acids were ammoniated. The gelatinous properties of the precipitated impurities often completely destroyed the fluidity of the high-grade products and made it necessary to dilute them with water to thereby lower the grade at the time of production in order to prevent excessive thickening or gelation in pumps, pipelines, and storage tanks because once such materials in the pumps, pipelines, valves, tanks, etc., do attain semisolid condition, it is extremely difficult to restore the fluidity.
[a]Others in the industry claim merchant-grade acid contains 50-58% $P_2O_5$.

Of the various methods and means available to the industry for manufacturing fertilizer suspensions from wet-process phosphoric acid one current process described by Jones in U.S. Pat. No. 4,066,432 seems to typify the best state of the art that allows for production of orthophosphate suspensions by ammoniation of low-cost wet-process orthophosphoric acid or other impure phosphoric acids in such a manner as to form concentrated N-$P_2O_5$ suspensions without formation of the usually occurring amorphous or gelatinous precipitates which cause high viscosity and nonpourability.

The orthophosphate suspension fertilizer made by Jones adds to, opens up, and makes workable this less expensive route for producing high-quality, high-analysis suspension fertilizers of a type that has low viscosity (free from metallic impurity gels), will not settle during transit, and has excellent long term warm weather storage properties. The theory behind Jones' invention is that high-analysis suspension fertilizers must be manufactured with a large abundance of small (thin) equilibrium-type crystals which are near in density to that of the solution phase, otherwise they will settle during vibration such as that which occurs during transit by rail. Furthermore, due to the great abundance of thin crystals, none will grow large or thick during storage and cooling.

The Jones process consists of ammoniating wet-process or other orthophosphoric acids in a first-stage boiling reactor to a pH (sample diluted 1:4 $H_2O$) in the range of about 3.5 to 5.0 (N:$P_2O_5$ ratio about 0.20 to 0.23), for prevention of formation of gel-like metallic impurity compounds. Subsequently, in a second stage, the resulting partially ammoniated acid is cooled to the range of 160° F. to 220° F. and further ammoniated to increase the N:$P_2O_5$ ratio from about 0.20 to 0.23 up to about a maximum of about 0.34. The material from this second stage of Jones' process is then cooled in another vessel to about 120° F., or lower, for production of a slurry containing only monoammonium phosphate crystals (N:$P_2O_5$ ratio up to about 0.28) depending upon the temperature, or both mono- and small diammonium phosphate (N:P$_2$O$_5$ ratio up to about 0.34) also dependent on temperature. Ammonia is then added rapidly in a third stage, such as a cooler, clay mixer, or other separate vessels for conversion of monoammonium phosphate crystals to diammonium phosphate crystals (N:P$_2$O$_5$ ratio 0.35 to about 0.37) without increasing the temperature in excess of about 110° F. Only small (thin) crystals of diammonium phosphate are found present in the product. These crystals do not settle and pack on the bottom of the container during vibration such as occurs during transit in railroad tank cars. Furthermore, an added benefit, freedom from polution as ammonia losses and entrained particles during the manufacturing steps, is obtained.

A large number of fluid fertilizer dealers are located in the colder regions of the United States and it is not unusual for them to handle their fluids at temperatures as low as 0° F., or lower. Orthophosphate suspensions prepared by prior-art processes including the Jones process, supra, become too thick to pump or handle at these temperatures whereas fluids containing polyphosphates remain fluid and free-flowing at temperatures of 0° F. or lower.

We have now discovered a way to produce a suspension fertilizer that is free-flowing and fluid at 0° F. or lower while utilizing the relatively inexpensive merchant-grade wet-process acid in the production of a concentrated ammonium polyphosphate suspension fertilizer free of unavailable P$_2$O$_5$ that can be produced in equipment much simpler and less complicated than that described by Getsinger in U.S. Pat. No. 3,382,059, Meline et al in U.S. Pat. No. 3,733,191, and Ellis et al in U.S. Pat. No. 3,185,075, supra. Our process utilizes an improved, enlarged pipe reactor that does not become clogged during extended operations. Our discovery is that by incorporating polyphosphate in the suspension, we are able for the first time, to produce suspensions that have acceptable low-temperature storage capabilities and by carrying out the reaction in a simple but improved enlarged pipe-type reactor, we are able to simplify the entire process for making suspensions that should have wide usage throughout the United States without regard to extremes in the weather.

In order that those skilled in the art may better understand how the present invention can be practiced, our invention is described below together with further objects and advantages thereof which will be better understood from a consideration of the following drawings, descriptions, and illustrative examples.

Figure 1:
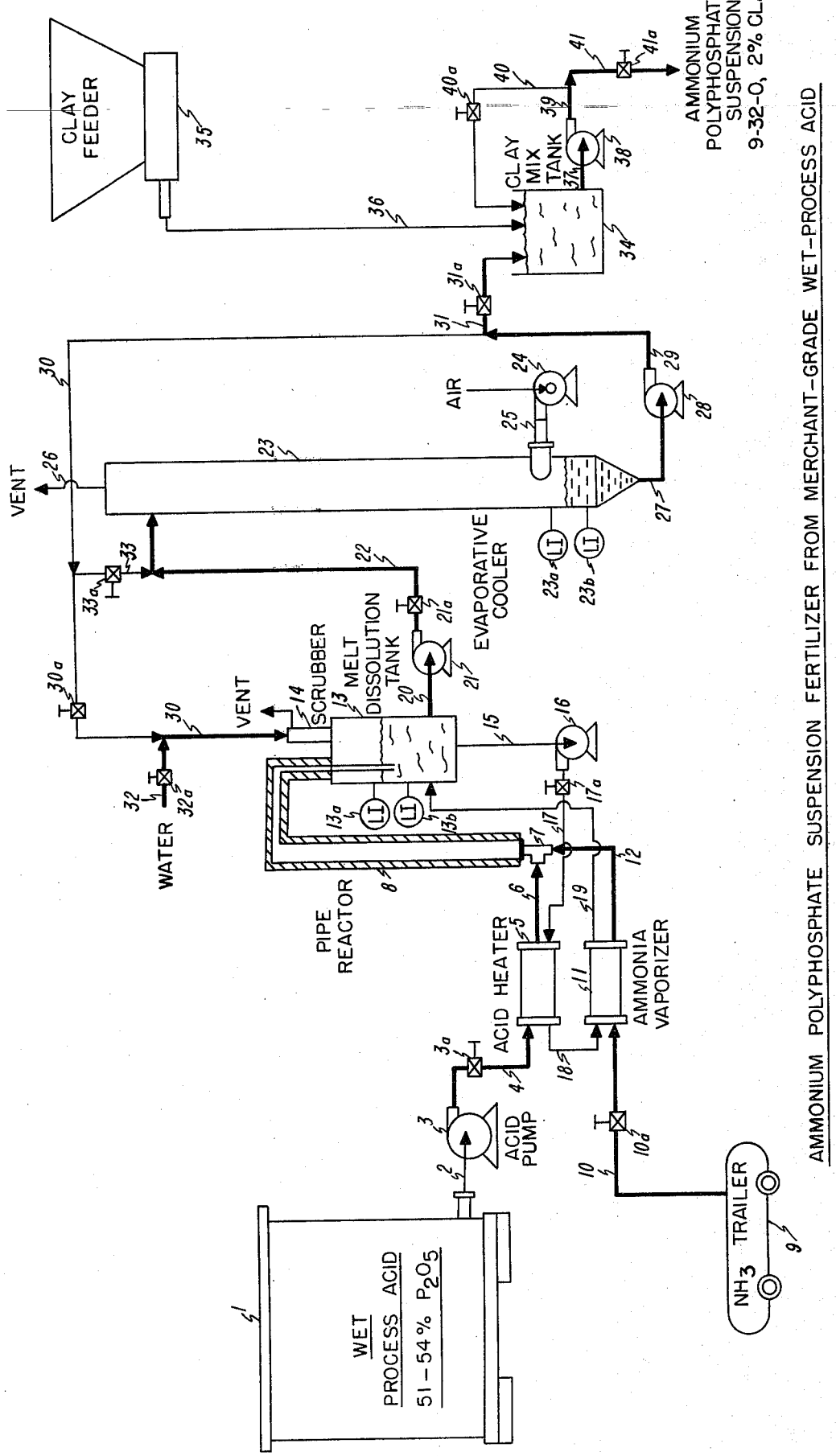
FIG. 1 is a flowsheet generally illustrating the principles of our novel process.

Referring now more specifically to FIG. 1, merchant-grade wet-process phosphoric acid is stored in and fed from tank 1 via line 2 to metering means 3, means for control of flow 3a, through line 4 to acid heater 5. From acid heater 5 the acid goes through line 6 to tee 7 and on to enlarged pipe reactor 8. Liquid ammonia from storage tank 9 is fed via line 10, means for control of flow 10a, to ammonia vaporizer 11 and on through line 12 to tee 7 and pipe reactor 8. After ammoniation of the wet-process acid in pipe reactor 8, the resulting ammonium polyphosphate melt flows into melt dissolution tank 13. The liquid level in melt dissolution tank 13 is monitored by means of indicators 13a and 13b. A scrubber 14 mounted on top of melt dissolution tank 13 recovers any unreacted ammonia from melt dissolution tank 13. The heat required for acid heater 5 and ammonia vaporizer 11 comes from the hot ammonium polyphosphate liquid in melt dissolution tank 13. The transfer of heat takes place when the hot ammonium polyphosphate liquid flows from melt dissolution tank 13 via line 15 to pump 16, means for control of flow 17a, through line 17 to acid heater 5; the hot ammonium polyphosphate liquid leaves acid heater 5 via line 18 and enters ammonia vaporizer 11. From here the liquid is fed back to melt dissolution tank 13 via line 19. The hot ammonium polyphosphate liquid from melt dissolution tank 13 flows via line 20 to pump 21, means for control of flow 21a, through line 22 to cooler 23. Any type cooler can be used if the liquid does not contain crystals and in this FIGURE, a packed-tower type of evaporative cooler is shown for illustrative purposes only. Cooler 23 utilizes air from air blower 24 which is forced through the bottom of evaporative cooler 23 via line 25 and thus cools the incoming hot ammonium polyphosphate liquid that enters cooler 23 via line 22. The air from evaporative cooler 23 is vented via line 26 to the atmosphere. The liquid level in evaporative cooler 23 is monitored by means of indicators 23a and 23b. The cooled ammonium polyphosphate slurry leaves evaporative cooler 23 via line 27 through pump 28 through line 29 to lines 30 and 31 where the stream is split. Part of the cooled ammonium polyphosphate slurry flows through line 30, means for control of flow 30a, and back to melt dissolution tank 13. Water of formulation from a source not shown enters via line 32 and passes through means of flow control 32a and mixes with the slurry in line 30 for cooling purposes and to dissolve the ammonium polyphosphate melt in dissolution tank 13. Line 33 is used as a recycle line to send part of the ammonium polyphosphate slurry, through means for control of flow 33a, to cooler 23. Line 31 carries the remainder of the cooled ammonium polyphosphate slurry from evaporative cooler 23, through means for control of flow 31a, to clay mixing tank 34. Clay feeder 35 feeds clay, which preferably is of the attapulgite type, into mixing tank 34 where the clay and the ammonium polyphosphate slurry in line 31 are combined. The clay is mixed with the slurry by recycling a part of the suspension back to mixing tank 34 in the following manner. The ammonium polyphosphate suspension leaves clay mixing tank 34 and flows via line 37 to clay-slurry mixing pump 38 through line 39 where the suspension splits into two lines 40 and 41, respectively. Line 40 recycles part of the suspension and sends it, through means for control of flow 40a, to clay mixing tank 34 to provide the desired degree of agitation. Line 41 sends the remainder of the suspension, through means for control of flow 41a, to a storage tank not shown.

From our experiments and tests to date, we have determined the following ranges of operating conditions:

| Variable | Operating range | Preferred range |
|---|---|---|
| $H_3PO_4$ feed temperature (to pipe reactor), °F. | 50–210 | 80–200 |
| $NH_3$ feed temperature, °F. | 50–200 | 75–190 |
| Enlarged pipe reactor temperature, °F. | 400–550 | 420–520 |
| Melt dissolution tank temperature, °F. | 150–220 | 160–210 |
| Retention time in melt dissolution tank, min. | 5–60 | 7–35 |
| $N:P_2O_5$ weight ratio | 0.268–0.331 | 0.27–0.32 |
| Percent of total $P_2O_5$ as nonortho $P_2O_5$ | 10–40 | 15–35 |
| Cooler temperature, °F. | 90–150 | 95–120 |
| Percent total plant food (% N + % $P_2O_5$) without clay | 40–47 | 41–46 |

Figure 2:
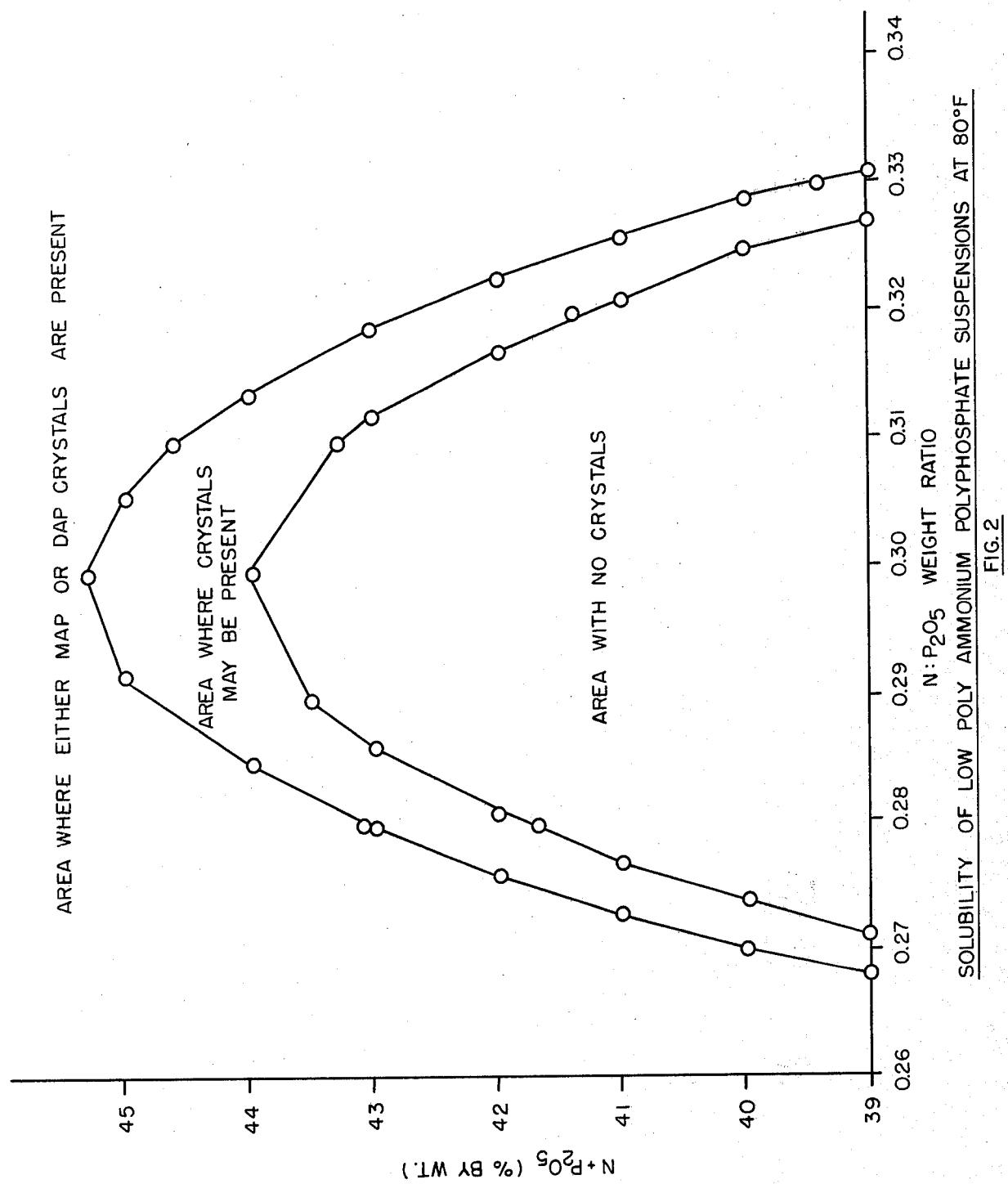
FIG. 2 is a solubility diagram based on 85 actual fluids made in our continuous-type equipment using wet-process orthophosphoric acid.

Referring now more specifically to FIG. 2, which is a solubility diagram based on 85 actual fluids made in our continuous-type equipment using wet-process orthophosphoric acid, information presented in this figure will show those skilled in the art the ratio of ammonia and phosphoric acid required to produce a crystal-free liquid at 80° F. that will not foul the cooler heat transfer surface with ammonium phosphate crystals. None of the previously mentioned prior art has shown any recognition that for successful continuous-type operation of their coolers, the fluid to be cooled must be free of crystals or else the crystals will grow on the heat transfer surface and foul the cooler. Example I illustrates operation at the top of the solubility curve, Example II, at the left side, and Example III, at the right side.

It should be noted that the equipment used to produce the suspensions in all three examples was not set up or operated to obtain maximum utilization of the heat generated and the important areas for heat conservation were simulated by using steam or hot water to provide the heat. Also, in these tests a shell-and-tube type of cooler was used to cool the liquid first before the attapulgite clay was added batchwise.

Figure 3:
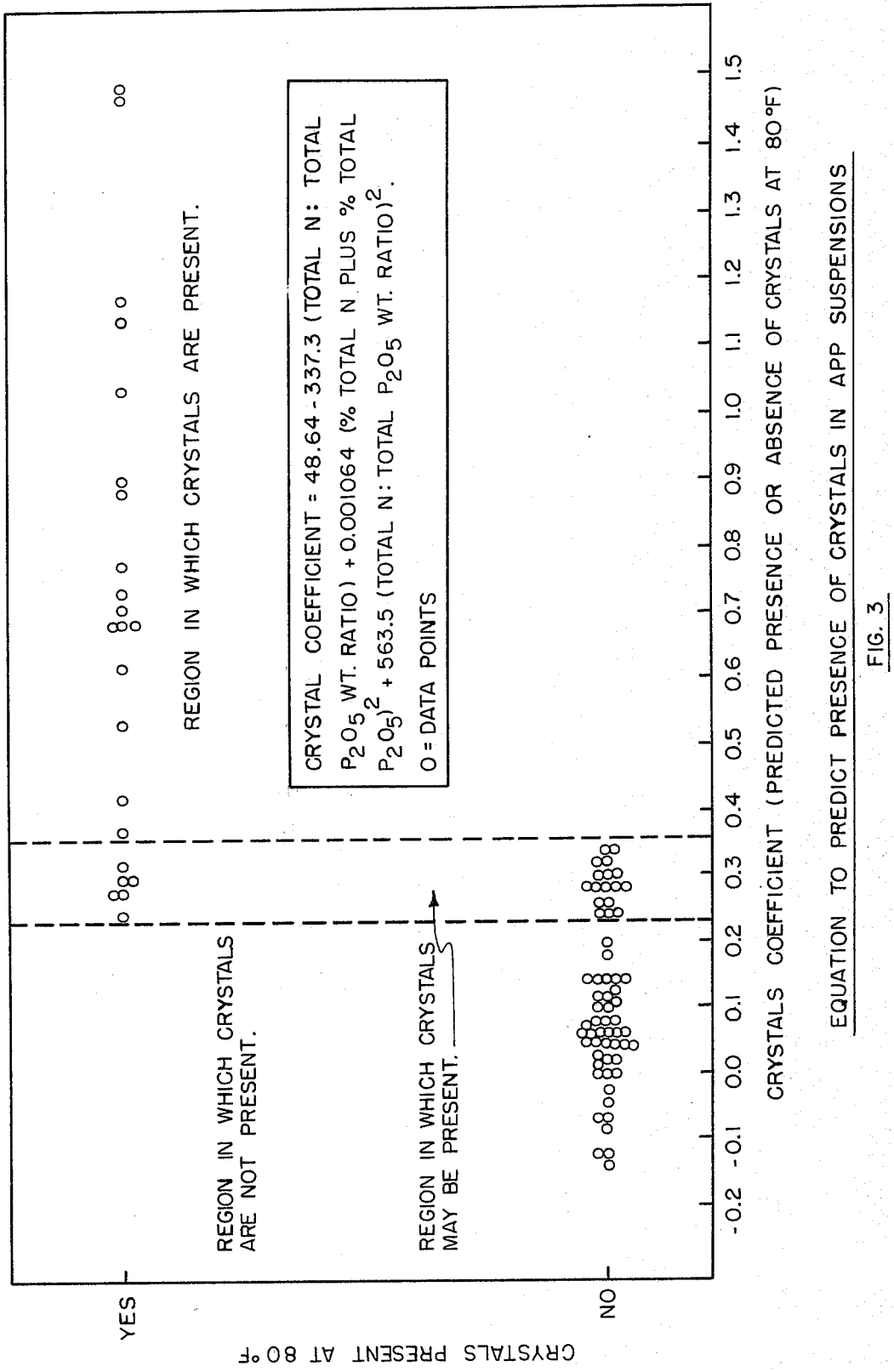
FIG. 3 is information that, based on data from the 85 fluids, supra, will allow those skilled in the art to predict by our equation the crystal coefficient which indicates the presence or absence of crystals in ammonium polyphosphate fluids at 80° F.

Referring now more specifically to FIG. 3, which is information that, based on data from the 85 fluids, will allow those skilled in the art to predict by our equation the crystal coefficient which indicates the presence or absence of crystals in ammonium polyphosphate fluids at 80° F. Our equation will give what we call a crystal coefficient which can be used in lieu of FIG. 3 to predict when crystals will be present in the fluid, or alternatively, the total plant food possible if the $N:P_2O_5$ ratio and crystal coefficient are known. The data from each of the 85 fluids is represented by circles on the figure and, as can be seen, if the crystal coefficient is 0.23 or less, no crystals would be expected to the present while, if the coefficient is 0.35 or higher, crystals are very likely to be present. Between a crystal coefficient of 0.23 and 0.35 is a "gray area" where crystals may or may not be formed.

Figure 4:
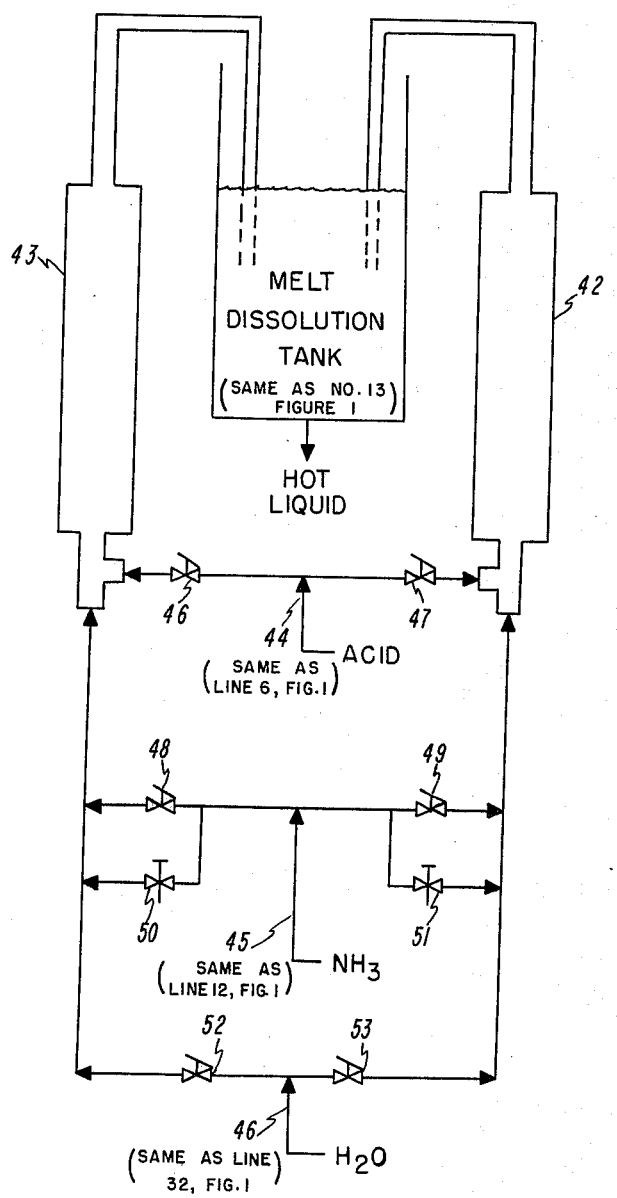
FIG. 4 is a flow diagram illustrating a dual pipe reaction system and a piping arrangement for removing reaction products that cause stoppages in the pipe reactor by feeding aqua ammonia to the partially clogged pipe reactor while the other pipe reactor is operated to produce molten ammonium polyphosphate.

Referring now more specificaly to FIG. 4, which is a flow diagram illustrating a dual pipe reaction system that will allow the process illustrated in FIG. 1 to be operated on a 3-shift-per-day, 7-day per week basis, our experience with the process has shown that the major drawback to continuous operation of the process is buildup of material on the walls inside the pipe reactor which eventually causes the reactor to become clogged and prevents acid and ammonia from passing through the pipe reactor. The rate of buildup inside the pipe reactor varies with the quality of wet-process acid used and the reactor throughput expressed in this patent as pounds $P_2O_5$ per hour per unit of reactor surface area and reactor volume. Our operating experience in the pilot plant has shown that the material that clogs the reactor is soluble in aqua ammonia. Therefore, the flow diagram shown in FIG. 4 and described in detail in Example IX illustrates the use of a mixture of feed water and a small percentage of the ammonia feed to solubilize the material partially clogging one pipe reactor in the process while the other pipe reactor is being operated to produce the molten ammonium polyphosphate.

Figure 5:
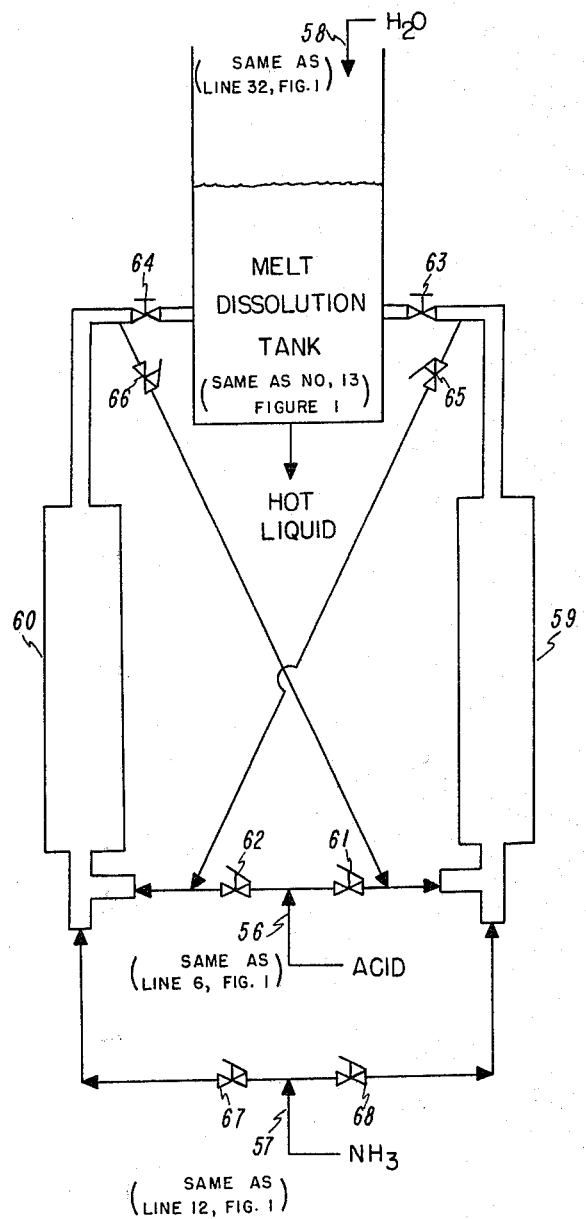
FIG. 5 is a flow diagram illustrating a dual pipe reaction system and a piping arrangement for removing reaction products that cause stoppages in the pipe reactor by feeding wet-process phosphoric acid to the partially clogged pipe reactor while the other pipe reactor is operated to produce molten ammonium polyphosphate.

Referring now more specifically to FIG. 5, which is a flow diagram illustrating a dual pipe reaction system that will allow the process illustrated in FIG. 1 to be operated on a 3-shift per day, 7-day per week basis, our experience with the process has shown that the major drawback to continuous operation of the process is buildup of material on the walls inside the pipe reactor which eventually causes the reactor to become clogged and prevents acid and ammonia from passing through the pipe reactor. The rate of buildup inside the pipe reactor varies with the quality of wet-process acid used and the reactor throughput expressed in this patent as pounds $P_2O_5$ per hour per unit of reactor surface area and reactor volume. Our operating experience in the pilot plant has shown that the material that clogs the reactor is soluble in phosphoric acid. Therefore the flow diagram shown in FIG. 5 and described in detail in Example IX illustrates the use of the wet-process phosphoric acid feed to solubilize the material partially clogging one pipe reactor in the process while the other pipe reactor is being operated to produce the molten ammonium polyphosphate.

In order that those skilled in the art may better understand how the present invention can be practiced, the following examples of runs we have made in our continuous-type apparatus to produce ammonium polyphosphate suspensions from wet-process orthophosphoric acid are given by way of illustration and not necessarily by way of limitation.

In our studies, the suspensions that were considered to be satisfactory were at least 98 percent pourable at 80° F. and had viscosities that did not exceed 1000 centipoises at 80° F. or 1500 centipoises at 32° F. Satisfactory suspensions also contained no plus 20-mesh (800-micron) crystals and no crystals that settled and packed on the bottom of the container during quiescent storage. The maximum limit of settled crystals, after the vibration test (described in Example 1, U.S. Pat. No. 4,066,432, Jones), was set at 2 percent by volume. Clear liquid that formed on top of the suspensions during quiescent storage was considered undesirable but the products were not ruled unsatisfactory becuase sparging or recirculation would remix them. Additionally, it was thought that if the fluids could be cooled to 80° F. or lower without crystals being present, the product cooler could function continuously without crystals fouling the cooling surface. Thus, each solution was evaluated as produced to see if crystals were present at 80° F. If crystals were present in the "as produced" liquid at 80° F., the suspension was judged unsatisfactory. From an economic standpoint, the most desirable fluid is the most concentrated (wt % N+P$_2$O$_5$) fluid that can be produced, without crystals being present at 80° F. Also, the solidification temperature of each suspension was determined to evaluate when the suspension becomes too viscous to flow. No minimum temperature has been established but the lower the solidification temperature, the colder the climate the suspension can be stored in without encountering handling problems. For instance, 13-38-0 grade ammonium orthophosphate suspension can be handled at temperatures down to about 15° F. to 20° F. but then it solidifies. The presence of the polyphosphate in our suspensions allows them to be handled at temperatures well below 0° F.

Merchant-grade acids used in the examples infra had the following compositions as shown in Table I below.

TABLE I

| Composition of Merchant-Grade Acids Used in Tests | | | | | | | |
|---|---|---|---|---|---|---|---|
| Acid | Chemical analysis, % by weight | | | | | | |
| designation | P$_2$O$_5$ | Fe$_2$O$_3$ | Al$_2$O$_3$ | F | MgO | SO$_4$ | H$_2$O |
| A | 54.9 | 1.6 | 1.2 | 0.8 | 0.5 | 4.2 | — |
| G | 54.3 | 1.5 | 1.4 | 0.7 | 0.6 | 3.8 | — |
| Mixed | 52.8 | 1.5 | 1.9 | 1.1 | 0.8 | 3.6 | — |
| KM | 53.5 | 1.6 | 1.4 | 1.1 | 0.7 | 2.5 | 19.7 |
| CF | 53.6 | 1.4 | 1.3 | 0.8 | 0.6 | 3.1 | 20.5 |

Examples I, II, and III illustrate the importance of maintaining the correct weight percent of nitrogen and P$_2$O$_5$ and N:P$_2$O$_5$ ratio in the fluid to obtain the highest possible concentration of weight percent N and P$_2$O$_5$ without forming crystals that could foul the cooler heat transfer surface.

EXAMPLE I

This example is illustrative of how our process can be used to produce the maximum grade of ammonium polyphosphate suspension fertilizer from impure merchant-grade wet-process phosphoric acid. The acid used in these tests contained 52.8 percent P$_2$O$_5$, which is in the range considered to be merchant grade. Test A in Table II, infra, is illustrative of a run in which a fluid of the proper concentration is made in which no crystals are present at 80° F., while test B in Table II is illustrative of a run in which a fluid too concentrated was produced with the result that crystals were present in the final suspension. The formation of the crystals would have been predicted if the weight percent N and P$_2$O$_5$ had been known and either using data shown in FIG. 2 or the equation shown in FIG. 3. As can be seen, when the equipment is operated to give an N:P$_2$O$_5$ weight ratio of about 0.29 a satisfactory suspension containing about 44 weight percent N+P$_2$O$_5$ was produced, whereas increasing the percent N+P$_2$O$_5$ to about 46 percent when the N:P$_2$O$_5$ weight ratio was slightly more than 0.30 caused crystals to form and the suspension was considered unsatisfactory. Data obtained during the run and evaluation of the final suspension are shown in Table II, infra. Measurements of the solidification temperature show that the suspension produced during run A could be handled at temperatures down to 16° F. below zero before the suspension became too viscous to flow.

TABLE II

| Effect of Weight % N + P$_2$O$_5$ at N:P$_2$O$_5$ Weight Ratio of 0.29–0.30 | | |
|---|---|---|
| Test | A (STF-12A) Crystal free at 80° F. | B (STF-10D) Crystals present at 80° F. |
| Production Conditions | | |
| Wet-process acid | | |
| Designation | mixed | mixed |
| Temperature, °F. | 180 | 176 |
| Rate, lb/hr | 1196 | 1282 |
| Anhydrous ammonia | | |
| Temperature, °F. | 149 | 149 |
| Rate, lb/hr | 226 | 254 |
| Water (to melt dissolution tank) | | |
| Rate, lb/hr | 458 | 384 |
| Temperature, °F. | 68 | 68 |
| Enlarged pipe reactor | | |
| Diameter, inches | 4 | 4 |
| Length, feet | 6 | 6 |
| Temperature, °F. | 455 | 462 |
| Pressure, p.s.i.g. | 15–30 | 15–30 |
| Melt dissolution tank | | |
| Retention time, min | 20 | 20 |
| Temperature, °F. | 152 | 164 |
| Cooler | | |
| Retention time, min | 0.44 | 0.44 |
| Discharge temperature, °F. | 120 | 125 |
| Ammonium polyphosphate fluid | | |
| Solution to clay mix tank | | |
| Analysis, % by wt | | |
| Total N | 9.9 | 10.9 |
| Total P$_2$O$_5$ | 34.1 | 35.8 |
| Nonortho P$_2$O$_5$, % of total P$_2$O$_5$ | 26 | 31 |
| N:P$_2$O$_5$ weight ratio | 0.290 | 0.304 |
| Suspension from clay mix tank | | |
| Clay, % by wt | 1.5 | 1.5 |
| Solidification temperature, °F. | −16 | — |
| Total plant food, % N + % P$_2$O$_5$ | 43.3 | 46.0 |
| Crystal coefficient | 0.27 | 0.50 |
| Evaluation of Suspension | | |
| As produced | | |
| Viscosity at 80° F., cP | 100 | 120 |
| Pourability, % at 80° F. | 100 | 100 |
| Crystals present at 80° F. | No | Yes |
| Vibration test settling, volume % | a | b |
| Evaluation of suspension | Satisfactory | Unsatisfactory |
| After 30-day storage at 80° F. | | |
| Viscosity at 80° F., cP | 80 | — |
| Pourability, % at 80° F. | 100 | — |
| Crystals present at 80° F. | No | Yes |
| Vibrational test settling, volume % | a | b |
| Viscosity at 32° F., cP | — | — |
| Pourability, % at 32° F. | — | — |
| Crystals present at 32° F. | No | Yes |
| Overall evaluation of suspension | Satisfactory | Unsatisfactory | a No crystal present, so test not run.
b Suspension was unsatisfactory, so test not run.

EXAMPLE II

This example illustrates that it is necessary to maintain the proper N:P$_2$O$_5$ weight ratio at a particular suspension concentration or else crystals will form and likely precipitate. In this example, both runs were made to give suspensions containing about 40 weight percent N+P$_2$O$_5$, but test A was made at an N:P$_2$O$_5$ ratio of about 0.29 while test B was made at a lower N:P$_2$O$_5$ ratio of about 0.26. Referring to FIG. 2 supra, it would be predicted that the suspension made during test A would be free of crystals and that made in test B would contain crystals. The data presented in Table III, infra, does show that no crystals were present in test A, but that crystals did form during test B making the latter suspension unsatisfactory. The solidification temperature of the suspension made during test A which contained 30 percent of the P₂O₅ as polyphosphate was −6° F. which makes it much more suitable for handling than orthophosphate suspension in colder climates.

TABLE III

Effect of N:P$_2$O$_5$ Weight Ratio at 40% N + P$_2$O$_5$ Concentration

| Test | A (PR-102A) Crystal free at 80° F. | B (PR-21A) Crystals present at 80° F. |
|---|---|---|
| Production Conditions | | |
| Wet-process acid | | |
| Designation | mixed | mixed |
| Temperature, °F. | 189 | 72 |
| Rate, lb/hr | 1104 | 1177 |
| Anhydrous ammonia | | |
| Temperature, °F. | 130 | 145 |
| Rate, lb/hr | 205 | 190 |
| Water (to melt dissolution tank) | | |
| Rate, lb/hr | 591 | 493 |
| Temperature, °F. | 51 | 51 |
| Enlarged pipe reactor | | |
| Diameter, inches | 6 | 6 |
| Length, feet | 6 | 6 |
| Temperature, °F. | 458 | 416 |
| Pressure, p.s.i.g. | 15–28 | 15–28 |
| Melt dissolution tank | | |
| Retention time, min | 20 | 20 |
| Temperature, °F. | 150 | 150 |
| Cooler | | |
| Retention time, min | 0.44 | 0.44 |
| Discharge temperature, °F. | 122 | 119 |
| Ammonium polyphosphate fluid | | |
| Solution to clay mix tank | | |
| Analysis, % by wt | | |
| Total N | 8.9 | 8.4 |
| Total P$_2$O$_5$ | 31.2 | 32.2 |
| Nonortho P$_2$O$_5$, % of total P$_2$O$_5$ | 30 | 19 |
| N:P$_2$O$_5$ weight ratio | 0.285 | 0.259 |
| Suspension from clay mix tank | | |
| Clay, % by wt | 1.5 | 1.5 |
| Total plant food, % N + % P$_2$O$_5$ | 39.5 | 40.0 |
| Solidification temperature, °F. | −6 | +5 |
| Crystal coefficient | 0.06 | 0.83 |
| Evaluation of Suspension | | |
| As produced | | |
| Viscosity at 80° F., cP | 100 | 180 |
| Pourability, % at 80° F. | 100 | 100 |
| Crystals present at 80° F. | No | Yes |
| Vibration test settling, volume % | a | b |
| Evaluation of suspension | Satisfactory | Unsatisfactory |
| After 30-day storage at 80° F. | | |
| Viscosity at 80° F., cP | 100 | 200 |
| Pourability, % at 80° F. | 100 | 100 |
| Crystals present at 80° F. | No | Yes |
| Vibrational test settling, volume % | a | b |
| Viscosity at 32° F., cP | — | — |
| Pourability, % at 32° F. | — | — |
| Crystals present at 32° F. | No | Yes |
| Overall evaluation of suspension | Satisfactory | Unsatisfactory | a no crystal present, so test not run.
b Suspension was unsatisfactory, so test not run.

EXAMPLE III

This example illustrates how, if our process is operated to produce a suspension containing about 42 percent N+P₂O₅, that operation at too high an N:P₂O₅ weight ratio, which in the instance was about 0.32, would cause crystals to form making the suspension unsatisfactory whereas a slight decrease in N:P₂O₅ weight ratio to a value of about 0.31 would give a satisfactory suspension free of crystals at 80° F. Based on data shown in Table IV, infra, the presence or absence of the crystals could be predicted knowing the composition of the suspensions and plotting their respective values on the solubility curve shown in FIG. 2 or calculating the crystal coefficient using the equation shown in FIG. 3. The production equipment and acid used was the same as that described in Example I.

The suspension made during test A had a polyphosphate content of 28 percent and a solidification temperature of −15° F. which is certainly low enough to allow pumping and handling this fluid in most areas of the country during winter. Also 30-day evaluation of this suspension shows that it can be stored and will remain in acceptable condition for long periods of time.

This data presented in Examples I, II, and III show that satisfactory suspensions can be produced as long as the composition of matter is restricted to the acceptable range presented in the solubility curve shown in FIG. 2.

TABLE IV

Effect of N:P$_2$O$_5$ Weight Ratio of 0.31 and 0.32 at N + P$_2$O$_5$ Concentration of About 42 Percent

| Test | A (STF-5C) Crystal free at 80° F. | B (PR-131A) Crystals present at 80° F. |
|---|---|---|
| Production Conditions | | |
| Wet-process acid | | |
| Designation | mixed | mixed |
| Temperature, °F. | 180 | 102 |
| Rate, lb/hr | 1161 | 1151 |
| Anhydrous ammonia | | |
| Temperature, °F. | 140 | 130 |
| Rate, lb/hr | 233 | 240 |
| Water (to melt dissolution tank) | | |
| Rate, lb/hr | 526 | 509 |
| Temperature, °F. | 68 | 52 |
| Enlarged pipe reactor | | |
| Diameter, inches | 4 | 6 |
| Length, feet | 6 | 6 |
| Temperature, °F. | 462 | 430 |
| Pressure, p.s.i.g. | 15–30 | 15–30 |
| Melt dissolution tank | | |
| Retention time, min | 20 | 20 |
| Temperature, °F. | 144 | 135 |
| Cooler | | |
| Retention time, min | 0.44 | 0.44 |
| Discharge temperature, °F. | 120 | 120 |
| Ammonium polyphosphate fluid | | |
| Solution to clay mix tank | | |
| Analysis, % by wt | | |
| Total N | 10.0 | 10.4 |
| Total P$_2$O$_5$ | 32.4 | 32.6 |
| Nonortho P$_2$O$_5$, % of total P$_2$O$_5$ | 28 | 19 |
| N:P$_2$O$_5$ weight ratio | 0.309 | 0.319 |
| Suspension from clay mix tank | | |
| Clay, % by wt | 1.5 | 1.5 |
| Total plant food (% N + % P$_2$O$_5$) | 41.8 | 42.3 |
| Solidification temperature, °F. | −15 | −6 |
| Crystal coefficient | 0.13 | 0.31 |
| Evaluation of Suspension | | |
| As produced | | |
| Viscosity at 80° F., cP | 90 | 100 |
| Pourability, % at 80°F. | 100 | 100 |
| Crystals present at 80° F. | No | Yes |
| Vibration test settling, volume % | a | b |
| Evaluation of suspension | Satisfactory | Unsatisfactory |
| After 30-day storage at 80° F. | | |
| Viscosity at 80° F., cP | 100 | 100 |
| Pourability, % at 80° F., | 100 | 100 |
| Crystals present at 80° F. | No | Yes |
| Vibrational test settling, volume % | a | b |
| Viscosity at 32° F., cP | — | — |
| Pourability, % at 32° F. | — | — |
| Crystals present at 32° F. | No | Yes |
| Overall evaluation of suspension | Satisfactory | Unsatisfactory | a No crystal present, so test not run.
b Suspension was unsatisfactory, so test not run.

The next examples (IV, V, and VI) illustrate the various sizes of pipe reactors that have been tested and how some of these pipes remain free of buildup for relatively long operating times whereas others tend to become clogged and inoperable after a short period of operation.

EXAMPLE IV

This example is illustrative of how operation with our improved enlarged pipe reactor allows an increase in overall operating time without the pipe reactor becoming clogged while other prior-art type pipe reactors become clogged and inoperable after an unreasonably short period of operation. The data presented in Table V infra, shows that ammoniation of merchant-grade wet-process acid in a 1-inch-diameter common pipe reactor could only be continued for a short period of time without the pipe reactor becoming clogged, whereas, enlarging the pipe diameter to 2 inches increased the time operations could continue without stoppages occurring to about 4 hours. The most marked and unexpected improvement in operating time occurred when the pipe diameter was increased to 4 inches and 6 inches. Operation could then be continued for a number of one-shift-per-day runs totaling in excess of 75 hours without any clogging. After each shift of operation, the reactors were washed with water or steam for a short period of time. It should be noted that during operation in the 4-inch-diameter pipe, a scale of coating gradually built up inside the pipe but it never became thicker than about ½ inch. The same phenomenon occurred with the 6-inch-diameter pipe, but the coating was about 1½ inches thick. Since both pipe reactors decreased in pipe diameter to about 3 inches, evidently this is the optimum size pipe that should be used with this acid at this production rate. The production rate in all of these runs, i.e., 1-inch, 2-inch, 4-inch, and 6-inch, was 2000 pounds of suspension per hour which was equivalent to about 660 pounds $P_2O_5$ per hour. The wet-process acid used in the tests was the mixed merchant-grade acid shown in Table I, supra.

If it is assumed that the optimum pipe diameter is about 3 inches, then the throughput is 93 pounds $P_2O_5$ per hour per square inch internal diameter (see table VII, infra), and a plant designed to produce 20 tons per hour of 9-32-0 grade suspension, utilizing the teachings of the instant invention, would require an enlarged reactor pipe 14 or 16 inches in diameter depending upon wall thickness of pipe, i.e., 13.4 inch I.D. by 6 feet long. Currently, most plants of this capacity that ammoniate superphosphoric acid as per U.S. Pat. No. 3,775,534 use a 4-inch-diameter pipe reactor. Some of the larger liquid fertilizer producers will operate at production rates of upwards of 30 tons of liquid fertilizer per hour. To obtain these higher throughputs, they use a pipe reactor about 6 inches in diameter. If this standard 6-inch-diameter pipe reactor was replaced with an enlarged pipe to produce 30 tons per hour of 9-32-0 liquid, our scale-up factor would indicate that the reactor should be 18-20 inches in diameter depending upon the wall thickness of the pipe used, i.e., 16.5-inch I.D.

The data shown in Table V, infra, also appears to indicate that there is a small increase in the amount of polyphosphate formed when the pipe reactor diameter is increased from 1 inch to 2 inches. A further small increase in polyphosphate content was also noted when the pipe reactor diameter was increased further from 2 inches to 4 inches, but no further significant increase occurred when the diameter was increased to 6 inches.

It should be noted that the equipment used to produce this suspension was not set up or operated to obtain maximum utilization of the heat generated and that the important areas for heat conservation were simulated by using steam or hot water to provide the heat. Also in these tests, a shell-and-tube type of cooler was used to cool the liquid first before the attapulgite clay was added batchwise.

Since these tests were made primarily to determine how long it would take for the pipe reactor to become clogged, little attention was paid to producing suspension of the proper grade. Consequently, all of the solutions were too concentrated, but the difficulty could be solved by simple dilution with water to the proper $N+P_2O_5$ content that is shown in FIG. 2.

TABLE V

| | | | | |
|---|---|---|---|---|
| Effect of Operation With Different Diameter Pipe Reactors | | | | |
| Production Conditions | Pipe not clogged | | Pipe clogged | |
| Wet-process acid | | | | |
| Designation | mixed | mixed | mixed | mixed |
| Temperature, °F. | 175 | 179 | 180 | 183 |
| Rate, lb/hr | 1235 | 1245 | 1236 | 1250 |
| Anhydrous ammonia | | | | |
| Temperature, °F. | 138 | 137 | 160 | 154 |
| Rate, lb/hr | 224 | 240 | 247 | 242 |
| Water (to melt dissolution tank) | | | | |
| Rate, lb/hr | 481 | 415 | 457 | 428 |
| Temperature, °F. | 45 | 67 | 86 | 77 |
| Pipe reactor | | | | |
| Diameter, inches | 6 | 4 | 2 | 1 |
| Length, feet | 6 | 6 | 6 | 6 |
| Diameter:length ratio | 0.084 | 0.056 | 0.029 | 0.015 |
| Temperature, °F. | 460 | 467 | 474 | 464 |
| Pressure, p.s.i.g. | 15–28 | 15–30 | 18–25 | 26–32 |
| Operating time without clogging, | Indefinite | Indefinite | 4.3 | 1.8 |
| Lb $P_2O_5$/hr/square inch internal pipe area | 23 | 52 | 197 | 764 |
| Lb $P_2O_5$/hr/cubic inch internal pipe volume | 0.3 | 0.7 | 2.7 | 10.6 |
| Melt dissolution tank | | | | |
| Retention time, min | 20 | 21 | 21 | 21 |
| Temperature, °F. | 149 | 157 | 168 | 169 |
| Cooler, surge tank | | | | |
| Retention time, min | 4 | 4 | 4 | 4 |
| Discharge temperature, °F. | 144 | 156 | 162 | 157 |
| Cooler, product | | | | |
| Retention time, min | ½ | ½ | ½ | ½ |
| Discharge temperature, °F. | 98 | 120 | 129 | 126 |
| Ammonium polyphosphate fluid Analysis, % by wt | | | | |
| Total N | 9.5 | 10.4 | 10.5 | 10.5 |
| Total $P_2O_5$ | 34.3 | 35.0 | 33.9 | 34.9 |
| Nonortho $P_2O_5$, % of total $P_2O_5$ | 28 | 27 | 21 | 16 |
| N:$P_2O_5$ weight ratio | 0.277 | 0.300 | 0.310 | 0.301 |

EXAMPLE V

Another series of tests was made in ⅜ inch diameter by 14 inches long and ¾-inch diameter by 6 feet long pipe reactors to provide additional data to help define the parameters that are important in designing a pipe reactor that will not clog rapidly. In these tests, which are shown in Table VI, infra, the equipment used to produce the suspensions was not set up or operated to obtain maximum utilization of the heat generated. The important areas for heat conservation were simulated by using steam to provide the heat. Also, in these tests a shell- and tube-type of cooler was used to cool the liquid first before the attapulgite clay was added batchwise.

Again, as occurred in the previous example, little attention was given to producing liquids of the proper grade or N:P$_2$O$_5$ weight ratio since the tests were made to determine how long the pipe reactor could be operated without stoppages occurring. Consequently, none of the liquids were processed into suspensions.

Results from these tests show that stoppages occurred when the ⅜ inch-diameter pipe was used, but not when the ¾ inch-diameter pipe was used. A summary of several parameters that we deem relevant is shown in Table VII, infra; the data was taken from tests reported in Tables V and VI. From this data indications are that, if the pipe were constructed so that the throughput per unit of area was in the range of about 20 to 100 pounds P$_2$O$_5$ per hour per square inch of internal pipe cross sectional area and the throughput per unit of volume was in the range of about 0.25 to 2 pounds of P$_2$O$_5$ per hour per cubic inch of internal reactor volume, the pipe reactor would not clog rapidly. It appears that the pipe design must include both the area and the volume parameters mentioned above to be designed correctly.

In comparison, a reaction pipe 2 feet in diameter by 4 feet long described by Marino[1] had a throughput of 11,916 pounds P$_2$O$_5$ which would be equivalent to a throughput per unit area of 26 pounds P$_2$O$_5$ per hour per square inch pipe area and a throughput per unit volume of 0.05 pounds P$_2$O$_5$ per hour per cubic inch of reactor volume. This apparatus would have considerably more retention time than our enlarged pipe reactor, and for that reason would probably cause P$_2$O$_5$ availability problems similar to those encountered by Getsinger (U.S. Pat. No. 3,382,059).

[1] Mechanical Engineering, Jan. 1962, pages 34–36

Most pipe reactors currently being used to produce high polyphosphate 10-34-0 liquid fertilizer by Meline's U.S. Pat. No. 3,775,534 are about 4 inches or 6 inches in diameter, about 8 to 14 feet in length, and have throughputs of 20 to 30 tons per hour of liquid. The longest reported pipe reactor currently in operation is about 33 feet long and produces about 20 tons of high polyphosphate 10-34-0 per hour. The throughput per unit area of this extra long pipe reactor if the pipe diameter were 4 inches or 6 inches would be 1083 or 481 pounds P$_2$O$_5$ per hour per square inch reactor area, respectively, and 2.7 or 1.2 pounds P$_2$O$_5$ per hour per cubic inch reactor volume, respectively. Neither of these size reactors have both area and volume parameters within our specified range.

TABLE VI

Production of Ammonium Polyphosphate Suspensions Using ⅜-Inch and ¾-Inch Diameter Pipe Reactors

| Production conditions Test No. | Pipe not clogged S-8-30-2 | Pipe not clogged S-11-16-2 | Pipe clogged after 15 hours 12-20-1 |
|---|---|---|---|
| Feed acid | | | |
| Designation | KM | KM | CFI |
| Temperature, °F. | 180 | 180 | 225 |
| Rate, lb/hr | 26.4 | 37.0 | 26.4 |
| Anhydrous ammonia | | | |
| Temperature, °F. | 80 | 80 | 80 |
| Rate, lb/hr | 5.8 | 6.9 | 5.6 |
| Water (to melt dissolution tank) | | | |
| Rate, lb/hr | 6.6 | 11.5 | 80 |
| Temperature, °F. | 80 | 80 | 80 |
| Pipe reactor | | | |
| Diameter, inches | ¾ | ¾ | ⅜ |
| Length, | 6 feet | | 14 in. |
| Diameter/length ratio | 0.010 | | 0.027 |
| Lb P$_2$O$_5$/hr/square inch internal pipe area | 26 | 37 | 73 |
| Lb P$_2$O$_5$/hr/cubic inch internal pipe volume | 0.36 | 0.51 | 5.2 |
| Temperature, °F. | 360 | 400 | 430 |
| Pressure, p.s.i.g. | 10–40 | 10–40 | 5$^a$ |
| Melt dissolution tank | | | |
| Retention time, min. | 30 | 40 | 30 |
| Temperature, °F. | 180 | 180 | 165 |
| Cooler | | | |
| Retention time, min | 22 | 30 | 15 |
| Discharge temperature, °F. | 95 | 130 | 130 |
| Ammonium polyphosphate fluid | | | |
| Analysis, % by wt | | | |
| Total N | 12.4 | 10.2 | 11.7 |
| Total P$_2$O$_5$ | 36.3 | 35.7 | 36.0 |
| Nonortho P$_2$O$_5$, % of total P$_2$O$_5$ | 19 | 30 | 22 |
| N:P$_2$O$_5$ weight ratio | 0.342 | 0.286 | 0.325 |

$^a$Pressure before pipe clogged.

TABLE VII

Possible Parameters That May Be Important in Design of a Nonclogging Pipe Reactor

| | | | | | | | |
|---|---|---|---|---|---|---|---|
| Pipe diameter, inches | | | | | | | |
| nominal | ⅜ | ¾ | 1 | 2 | .$^a$ | 4 | 6 |
| internal | 0.493 | 0.824 | 1.049 | 2.067 | 3 | 4.026 | 6.065 |
| Internal pipe, area, in$^2$ | 0.192 | 0.534 | 0.864 | 3.355 | 7.065 | 12.73 | 28.89 |
| Pipe length, inches | 14 | 72 | 72 | 72 | 72 | 72 | 72 |
| Pipe nominal diameter: length ratio | 0.027 | 0.010 | 0.014 | 0.028 | 0.042 | 0.056 | 0.083 |
| Pound P$_2$O$_5$/hr | 14 | 9–20 | | | ← 660 → | | |
| Throughput: lb P$_2$O$_5$/hr/sq. inch internal pipe area | 73 | 17–37 | 764 | 197 | 93 | 52 | 23 |
| Throughput: lb P$_2$O$_5$/hr/cubic inch internal pipe volume | 5.2 | 0.26–0.51 | 10.6 | 2.7 | 1.3 | 0.7 | 0.3 |
| Did pipe reactor clog$^b$ | Yes | No | Yes | Yes | — | No | No |
| % of P$_2$O$_5$ as polyphosphate in suspension fertilizer | 22 | 19–30 | 16 | 21 | — | 27 | 28 |

$^a$Hypothetical pipe size--this was about the opening remaining in the 4- and 6-inch pipe reactors after they had been operated for extended periods without stoppages.
$^b$during single shift operation

EXAMPLE VI

This example is illustrative of how our process will produce a satisfactory suspension using the energy efficient techniques we have built into the process so that no external heat is required to produce a suspension of the proper grade (weight % N+$P_2O_5$) and polyphosphate content that is free of crystals at 80° F. and which can be stored without difficulty and cooled to well below zero ° F. without solidification. Data from the run are shown in Table VIII, infra. In making the product, by the process illustrated in FIG. 1, merchant-grade wet-process acid containing 53.5 percent $P_2O_5$ was pumped through a shell and tube heat exchanger and heated to 180° F. with 200° F. liquid fertilizer from the melt dissolution tank. Anhydrous liquid ammonia was fed through a separate shell and tube heat exchanger where it was heated to 180° F. with 190° F. liquid fertilizer discharged from the acid heater. The hot acid and gaseous ammonia then flowed to the 1½ inch diameter by 6-feet long pipe reactor where they reacted and formed the polyphosphate at a temperature of 450° F. The hot melt from the pipe reactor discharged into the melt dissolution tank where sufficient water was added to give liquid of the desired density. The liquid in the melt dissolution tank was then pumped to a packed tower evaporative cooler where it was cooled to 110° F. About 90 cubic feet of 80° F. air per minute was fed into the bottom of the cooler, below the 8-feet high bed of 1½-inch diameter pall ring packing, to provide the evaporative cooling. Part of the 110° F. liquid was recycled to the melt dissolution tank to control the temperature in this tank at 200° F. About 2 percent attapulgite clay was added and the suspension then evaluated for its storage characteristics. The product suspension had a grade of 9.7-32.1-0, an N:$P_2O_5$ weight ratio of 0.302, contained 18 percent polyphosphate, a solidification temperature of −11° F., and a crystal coefficient of 0.028. No crystals were present in the product liquid of 9.9-32.8-0 grade when it was cooled to 80° F. as produced; the absence of crystals was confirmed by calculating its crystal coefficient which indicated that no crystals should have been present. The overall evaluation of the suspension after 30 days of storage at 80° F. and 32° F., showed that it was a satisfactory product.

After a total of about 16 hours of intermittent operation in two 8 hour/day shifts, the reactor was disassembled and there was absolutely no sign of scale buildup anywhere within the pipe. This indicates that the enlarged pipe reactor will operate in the nonclogging manner as predicted.

TABLE VIII

Production of Low Polyphosphate APP Suspension in Energy Efficient Equipment Utilizing a Nonclogging Pipe Reactor

| Test No. | S-8-25 |
| --- | --- |
| Production Conditions | |
| Feed acid | |
| Designation | KM |
| Temperature, °F. | 180 |
| Rate, lb/hr | 330 |
| Anhydrous ammonia | |
| Temperature, °F. | 180 |
| Rate, lb/hr | 58 |
| Water (to melt dissolution tank) | |
| Rate, lb/hr | 139 |
| Temperature, °F. | 80 |
| Enlarged pipe reactor | |
| Diameter, inches | 1½ |
| Length, feet | 6 |
| Diameter:length ratio | 0.021 |
| Temperature, °F. | 450 |
| Pressure, p.s.i.g. | 25–30 |
| Melt dissolution tank | |
| Retention time, min | 20 |
| Temperature, °F. | 200 |
| Evaporative cooler, packed tower | |
| Airflow, cfm | 87 |
| Retention time, min | 5 |
| Discharge temperature, °F. | 110 |
| Ammonium polyphosphate fluid | |
| Solution to clay mix tank, lb/hr | 502 |
| Analysis, % by wt | |
| Total N | 9.9 |
| Total $P_2O_5$ | 32.8 |
| Nonortho $P_2O_5$, % of total $P_2O_5$ | 18 |
| N:$P_2O_5$ weight ratio | 0.302 |
| Lb $P_2O_5$/hr/square inch internal pipe reactor area | 86 |
| Lb $P_2O_5$/hr/cubic inch internal pipe reactor volume | 1.1 |
| Suspension from clay mix tank | |
| Clay, % by wt | |
| Solidification temperature, °F. | −11 |
| Total plant food (% N + $P_2O_5$) | 41.8 |
| Crystal coefficient | 0.028 |
| Evaluation of Suspension | |
| As produced | |
| Viscosity at 80° F., cP | 100 |
| Pourability, % at 80° F. | 100 |
| Crystals present at 80° F. | No |
| Vibration test settling, volume % | 0 |
| Evaluation of suspension | Satisfactory |
| After 30-day storage at 80° F. | |
| Viscosity at 80° F., cP | 100 |
| Pourability, % at 80° F. | 100 |
| Crystals present at 80° F. | No |
| Vibrational test settling, volume % | a |
| Viscosity at 32° F., cP | — |
| Pourability, % at 32° F. | — |
| Crystals present at 32° F. | No |
| Overall evaluation of suspension | Satisfactory | a No crystal present, so test not run.

The next series of examples VII and VIII illustrate how in round-the-clock continuous 24-hour per day operation the enlarged type of pipe reactor eventually does become clogged and how, as shown in Example IX, operation can be continued on a continuous round-the-clock basis utilizing a dual pipe reactor system. This dual pipe reactor system employs a new, novel, and workable method for cleaning a partially clogged pipe reactor without slowing or stopping production and also allows the use of pipe reactors that have a higher throughput than had previously been thought possible while still obtaining polyphosphate contents higher than are obtainable in pipe reactors normally designed for use with superphosphoric acid.

EXAMPLE VII

Multishift Production of 50 Tons of 9-32-0

About 53 tons of 9-32-0 suspension containing 32 percent polyphosphate and 2½ percent clay was produced in the 1-ton-per-hour pilot plant similar to that described in Example IV for shipment to Great Dane Fertilizer Company, Audobon, Iowa, to evaluate its shipping and storage properties under actual field conditions. The pilot plant was run continuously on a 3-shift per day basis for 53 operating hours and produced about 49 tons; an additional 4 tons was produced during a subsequent day shift of operation to finish loading the 10,000 gallon tank car. Results from the run are shown in Table XI, infra. The only major operating difficulty encountered was stoppages in the 4-inch and 6-inch-diameter pipe reactors at about 15- to 18-hour intervals. The pipes were not completely plugged after 15 to 18 hours of operation, but the buildup was so great that the pressure on the acid feed line entering the reactor increased from about 30 psig (clean pipe) to 60 to 70 psig, and neither the acid nor the ammonia feed rates could be maintained against this pressure. The multishift operation was started with the 6-inch pipe reactor in place; when the reactor pressure reached about 70 psig, the plant was shut down and the clean 4-inch reactor was installed. The buildup in the 6-inch-diameter reactor was removed by blowing steam through the pipe. This procedure of alternating reactors was continued until the last day when steam was blown through the reactor for about 10 minutes without removing it from the plant; the pressure did drop back to 30 psig indicating the buildup had been removed and the reactor was then operated for an additional 10 hours when multishift operation was ended as scheduled. Thus, this procedure of cleaning the pipe in place illustrates a method of continuing operation with only a minimum of downtime during continuous operation and would be a feasible approach if only one shift/day operation were required.

To ensure that the polyphosphate level was at least 25 percent of the total $P_2O_5$, the feed acid was heated to about 200° F., which resulted in a pipe-reactor temperature of 475° to 510° F. Normally the feed acid is heated to about 180° F. resulting in a pipe-reactor temperature of 450° to 470° F. and a product containing 23 to 28 percent of the $P_2O_5$ as polyphosphate. After the railroad tank car was loaded with 53.5 tons of suspension, it was mixed with an air sparger and sampled before being shipped to Iowa for storage and evaluation.

Analysis of the composite sample showed that it had a grade of 9.6-32.3-0 (0.297 N:$P_2O_5$ weight ratio, 1.5 $NH_3$:$H_3PO_4$ mole ratio) and contained 32 percent of the $P_2O_5$ as polyphosphate. The stable gel strength was 1.6 gm-cm. Because of mechanical difficulties with the tank car, the suspension was in transit for 5 weeks before it reached Coon Rapids, Iowa, where it was transferred to trailers and trucked to Audobon, Iowa. Samples and temperatures of the suspension were obtained as it was unloaded from the rail tank car and the suspension was in good condition, free flowing, free of crystals, and no difficulties were encountered in either transferring the material to the trailers or to the 12,000-gallon storage tank at Great Dane Fertilizer Company in Audobon, Iowa. The temperature of the suspension in the tank car ranged from 36° to 41° F. The suspension will be air sparged periodically in the 12,000-gallon storage tank and will be cold mixed with other fertilizer ingredients in the spring.

TABLE IX

| Run Conditions and Results of the Production of 53 Tons of 9-32-0 APP Suspension | |
|---|---|
| Test No. | 50T-1-81[a] |
| Acid | |
| Rate, lb/hr | 1219 |
| Temperature, °F. | 198 |
| $P_2O_5$, % by wt | 53.0 |
| Ammonia rate[b], lb/hr | 236 |
| $NH_3$:$H_3PO_4$ mole ratio | 1.53 |
| Water rate, lb/hr | 500 |
| Pipe reactor | |

TABLE IX-continued

| Run Conditions and Results of the Production of 53 Tons of 9-32-0 APP Suspension | | |
|---|---|---|
| Test No. | 50T-1-81[a] | |
| Dia × lb, in × ft | 6 × 6[c] | 4 × 6[d] |
| Temperature, °F. | 494 | 494 |
| Acid throughput | | |
| Lb $P_2O_5$/hr . in$^2$ | 23 | 51 |
| Lb $P_2O_5$/hr . in$^3$ | 0.32 | 0.71 |
| Heat input (heat flux)[e] | | |
| Btu/h . in$^2$ | 20,100 | 95,600 |
| Btu/h . in$^3$ | 279 | 633 |
| Btu/lb $P_2O_5$ | 889 | 899 |
| Melt dissolution tank | | |
| Temperature, °F. | 154 | |
| Product cooler temperature, °F. | 115 | |
| Clay mix tank | | |
| Temperature, °F. | 115 | |
| Clay rate, lb/hr | 50 | |
| Product | | |
| Total N, % by wt | 9.6 | |
| Total $P_2O_5$, % by wt | 32.3 | |
| N:$P_2O_5$ wt ratio | 0.297 | |
| $NH_3$:$H_3PO_4$ mole ratio | 1.51 | |
| Polyphosphate, % of $P_2O_5$ | 32 | |
| Clay, % by wt | 2.5 | |
| pH | 6.6 | |

[a]Data average over entire run time, includes 4- and 6-inch diameter reactor.
[b]$NH_3$ temperature to pipe reactor was about 120° F.
[c]18 hours total run time.
[d]35 hours total run time.
[e]The heat input (Btu/h) was calculated from the sensible heat in the acid and $NH_3$ above 70° F. plus the heat of reaction assuming 5 lb $NH_3$/unit $P_2O_5$ reacted in pipe reactor.

EXAMPLE VIII

This example summarizes in Table X a number of runs made in different size pipe reactors at production rates of 0.25- or 1-ton-per-hour of suspension fertilizer and shows the effect of throughput per internal square inch and throughput per internal cubic inch in the enlarged pipe reactor on the amount of polyphosphate formed and length of time the reactor can be operated without clogging. Tests made at 0.25 tons per hour were made in the same equipment as described in Example VI; the tests made at 1 ton per hour were made in equipment similar to that described in Example IV. Examination of the data shows that 1-shift-per-day operation cannot predict adequately how long a pipe reactor can be operated on a continuous basis unless the pipe reactor becomes clogged in one shift of operation. Unexpectedly all of the pipe reactors did become clogged during continuous operation, but the length of time they could be operated increased as the throughput per unit area was decreased. The amount of polyphosphate formed increased from 16 percent polyphosphate to about 25 percent polyphosphate as the throughput was decreased from 760 to 100 pounds $P_2O_5$ per hour per square inch. Further decreasing the throughput to as low as 15 pounds $P_2O_5$ per hour per square inch did not appear to significantly further increase the polyphosphate content which fluctuated between about 22 and 32 percent polyphosphate except in tests 6 and 13 where an acid with less impurities and more $P_2O_5$ was used. Likely, these fluctuations were caused by variations in composition of the merchant-grade wet-process acid and variations in heat input to the process. In any event, it appears that a practicable throughput to obtain a reasonable length of operating time and the maximum amount of polyphosphate in the suspension would range between 50 and 100 pounds $P_2O_5$ per hour per square inch, but could go as high as 200 pounds $P_2O_5$/hr.in$^2$ without in some cases seriously lowering the polyphosphate content; for a plant producing 20 tons per hour of suspension, throughputs of 50 and 100 pounds $P_2O_5$/hr.in$^2$ would calculate to be pipe reactor having diameters of 20 inches and 14 inches, respectively, while increasing the throughput to 200 pounds $P_2O_5$ per hour per square inch would decrease the pipe diameter further to about 10 inches. As shown in Table X, infra, the length of the pipe reactor does not appear to be critical and can range from about 3 feet to 9 feet in length, which would be equivalent to 1 to 0.3 pound $P_2O_5$ per hour per cubic inch of reactor volume, respectively.

other than the initial investment in the second reactor are involved.

The dual pipe reactor system is illustrated in detail in FIG. 4 and results from continuous operation which occurred in the following manner are shown in Table XI. In place of the single pipe reactor 8, FIG. 1, we have substituted two pipe reactors, number 42 and 43, connected to the acid source 44 (same as line 6, FIG. 1) connected to the anhydrous ammonia source 45 (same as line 12, FIG. 1), and connected to the water source at 46 (same as line 32, FIG. 1) means for flow control 32a. Assuming that reactor 42 is in operation and reactor 43

TABLE X

Summary of Runs to Produce 9-32-0 Grade Suspension in Several Size Pipe Reactors at Production Rates of 0.25 and 1-Ton/Hr.

| Test No. | Throughput Lbs. $P_2O_5$/hr-sq. in | Throughput cubic in | Tons suspensions/hr. | Hours of 1-shift/day operation before pipe clogged | Hours of 3-shift/day operation before pipe clogged | % of $P_2O_5$ as polyphosphate in suspension | Pipe reactor size, diameter, inches × length, feet |
|---|---|---|---|---|---|---|---|
| Operation with a 6-foot long pipe reactor | | | | | | | |
| 1 | 15 | 0.18 | 0.25 | >11 | — | 28 | 4" × 6' |
| 2 | 20 | 0.3 | 1 | >74 | 15 | 25–32 | 6" × 6' |
| 3 | 35 | 0.5 | 0.25 | >24 | — | 22–25 | 2½" × 6' |
| 4 | 50 | 0.7 | 1 | >85 | 15 | 25–32 | 4" × 6' |
| 5 | 80 | 1.1 | 0.25 | 12 | — | 23 | 1½" × 6' |
| 6 | 110 | 1.5 | 0.25 | 12 | >22 | 35–36 | 1¼" × 6' |
| 7, 13 | 190 | 2.7 | 0.25 | 5,(>5)$^a$ | 5,(31)$^a$ | 31–35 | 1" × 6' |
| 8 | 200 | 2.7 | 1 | 8.5 | — | 21 | 2" × 6' |
| 9 | 760 | 10.6 | 1 | 2 | 2 | 16 | 1" × 6' |
| 9 | 760 | 10.6 | 1 | 2 | 2 | 16 | 1" × 6' |
| Operation with a 2½-inch diameter pipe reactor | | | | | | | |
| 10 | 35 | 1 | 0.25 | >8 | — | 25 | 2½" × 3' |
| 3 | 35 | 0.5 | 0.25 | >24 | — | 22–25 | 2½" × 6' |
| 11 | 35 | 0.3 | 0.25 | >8 | — | 26 | 2½" × 9' |
| Operation at same throughput but different production rates | | | | | | | |
| 12 | 50 | 0.7 | 0.25 | >23 | — | 23 | 2" × 6' |
| 4 | 50 | 0.7 | 1 | >85 | 15 | 25–32 | 4" × 6' |

$^a$Pipe reactor clogged in 5 hours using one acid but was operated 31 hours continuously with another acid before pressure built up significantly.

EXAMPLE IX

Since the previous example VII showed that the enlarged pipe reactor will eventually clog, this example illustrates the procedure we have devised to operate a plant continuously even though the enlarged pipe reactors do eventually unexpectedly become clogged. To enable continuous operation, we have installed dual pipe reactors in place of the single pipe reactor 8 in FIG. 1. By using two pipe reactors, one reactor can be operated to produce ammonium polyphosphate while the other reactor which became clogged is being cleaned. The novelty of this approach is not in using two reactors alternately but in cleaning the reactors in place by dissolving the solids in the clogged reactor with either a mixture of water and ammonia or phosphoric acid that is normally fed to the process. The preferred procedure is to feed all of the formulated amount of water that is used by the process plus a small proportion of the total ammonia that is normally fed to the process into the reactor being cleaned. This warm dilute aqua ammonia solution will dissolve the solids in the reactor so that by the time the other reactor becomes clogged, the solids are dissolved and the reactor is clean and ready for operation. By using the raw materials normally fed to the process, no new materials are introduced into the process and no additional costs is being cleaned, the valves on the respective lines would be in the following positions.

| Valves open | Valves closed |
|---|---|
| 47 | 46 |
| 49 | 48 |
| 50$^a$ | 51 |
| 52 | 53 |

$^a$Opened only enough to add sufficient ammonia to warm water to 125° to 150° F.

When reactor 42 was being cleaned and reactor 43 was being used to form polyphosphate, the valves would be in the following position.

| Valves open | Valves closed |
|---|---|
| 46 | 47 |
| 48 | 49 |
| 51$^a$ | 50 |
| 53 | 52 |

$^a$Opened only enough to add sufficient ammonia to warm water to 125° to 150° F.

Thus, by alternately ammoniating in one reactor while the other reactor is being cleaned, continuous production of ammonium polyphosphate suspension is possible. This procedure allowed 2½ days of continuous operation with only two hours of downtime which was caused by problems in the ammonia feed system and not by pugging of the pipe reactors.

TABLE XI
Production of APP Suspension with Dual Pipe Reactor System

| Summary of Production Run | | | | | | | |
|---|---|---|---|---|---|---|---|
| Pipe reactor (dia. × length) | ← 1¼-inch by 6-ft → | | | ← 1-inch by 6-ft. → | | | ← 1¼-inch by 6-ft. → |
| Cumulative hours of plant operation | 6 | 14 | 21 | 7.4 | 14.4 | 36 | 1 |
| Pipe reactor pressure, psig | 28 | 26 | 30 | 25 | 35 | 42 | 24 |
| Status of pipe reactor | ← Operating → | | switching to 1″ pipe | Operating ← (1¼″ pipe being → washed out)$^c$ | | Clogged, switching to 1¼″ pipe | Operating ← (1″ pipe being → washed out)$^c$ |
| Details of Production Run | | | | | | | |
| Acid$^a$ feed rate, lb/hr | 336 | 328 | 364 | 360 | 364 | 312 | 316 |
| Acid temperature (at pipe reactor) | 157° F. | 167 | 156 | 155 | 153 | 154 | 156 |
| Ammonia feed rate, lb/hr | 64 | 64 | 68 | 68 | 68 | 64 | 64 |
| Ammonia temp. (at pipe reactor) | 176° F. | 189 | 182 | 180 | 177 | 175 | 183 |
| H$_2$O feed rate, lb/hr | 220 | 220 | 210 | 225 | 210 | 240 | 240 |
| Throughput, lb P$_2$O$_5$/hr-in$^2$ | 121 | 121 | 135 | 231 | 233 | 200 | 117 |
| Throughput, lb P$_2$O$_5$/hr-in$^3$ | 1.68 | 1.69 | 1.87 | 3.21 | 3.24 | 2.78 | 1.63 |
| Heat input, Btu/lb P$_2$O$_5$ | 866 | 878 | 866 | 864 | 862 | 864 | 867 |
| Melt dissolution tank temp. | 196° F. | 211 | 201 | 200 | 197 | 195 | 205 |
| Evaporative cooler discharge temp. | 112° F. | 108 | 118 | 120 | 123 | 112 | 100 |
| Product liquid | | | | | | | |
| Production rate, lb/hr | 524 | 528 | 563 | 565 | 575 | | 459 |
| Grade | 10.0-35.5-0 | 10.9-34.4-0 | 10.5-35.8-0 | 10.7-35.3-0 | 10.6-35.1-0 | | 11.0-38.1-0 |
| % of total P$_2$O$_5$ as polyphosphate | 30 | 35 | 33 | 31 | 33 | | 27 |
| N:P$_2$O$_5$ weight ratio | 0.282 | 0.317 | 0.293 | 0.303 | 0.302 | | 0.289 |
| % clay | 0 | 0 | 0 | 0 | 0 | | 0 |
| Calculated grade with 2% clay | 9.8-34.7-0 | 10.7-33-7.0 | 10.3-35.1-0 | 10.5-34.8-0 | 10.4-34.1-0 | | 10.8-37.3-0 |

$^a$Composition of acid is as follows, % by wt: P$_2$O$_5$ 554; Fe$_2$O$_3$ 1.2; Al$_2$O$_3$, 1.4; F, 0.48; MgO, 0.52; H$_2$O, 16.9.
$^b$Sum of sensible heat in acid and gaseous ammonia plus heat of ammoniation, assuming 70° F. datum plane.
$^c$All of water of formulation and 5-10% of total NH$_3$ was fed to non-operating pipe in dual reactor system.

If wet-process acid were used to clean out the dual pipe reaction system, a somewhat different flow pattern must be used as shown in FIG. 5. The procedure involves feeding all of the hot acid for the process via line 56 (same as line 6, FIG. 1) first to the reactor to be cleaned. The effluent from this reactor would then flow to the feed end of the second reactor where the acid is ammoniated with anhydrous ammonia fed via line 57 (same as line 12, FIG. 1) to form the ammonium polyphosphate melt which is then dissolved in water fed via line 58 (same as line 32, FIG. 1) in the melt dissolution tank. The valving arrangement for this system, when reactor 59, FIG. 5, is being cleaned and ammoniation is being carried out in reactor 60 is as follows:

| Valves open | Valves closed |
|---|---|
| 61 | 62 |
| 64 | 63 |
| 65 | 66 |
| 67 | 68 |

When reactor 55 is being cleaned and ammoniation is being carried out in reactor 54, the following valving arrangement is in effect.

| Valves open | Valves closed |
|---|---|
| 62 | 61 |
| 63 | 64 |
| 66 | 65 |
| 68 | 67 |

Thus, while alternately ammoniating in one reactor while the other one is being cleaned, continuous production of ammonium polyphosphate suspension is possible.

While we have shown and described particular embodiments of our invention, modifications and variations thereof will occur to those skilled in the art. We wish it to be understood, therefore, that the appended claims are intended to cover such modifications and variations which are within the true scope and spirit of our invention.

What we claim as new and desire to secure by Letters Patent of the United States is:

1. A process for preparing improved ammonium polyphosphate melts eminently suitable for ultimately preparing fertilizer base suspensions, which melts are produced from wet-process orthophosphoric acid and ammonia, and which base suspensions have markedly improved low temperature storage characteristics, which process comprises supplying a stream of vaporized ammonia heated to 50° F. to 200° F. to an enlarged diameter pipe reactor; supplying a stream of wet-process orthophosphoric acid heated to 50° F. to 210° F. and containing from about 50 to about 58 percent P$_2$O$_5$ to said enlarged pipe reactor; contacting said stream of heated vaporous ammonia with said stream of hot orthophosphoric acid at super atmospheric pressure and at temperatures in the range of about 400° F. to about 550° F. to form a resulting melt of ammonium polyphosphate wherein from about 10 to about 40 percent of the phosphorus values are converted to the nonortho acyclic species; controlling the flow rate of said stream of heated ammonia relative to the flow rate of said stream of heated orthophosphoric acid to maintain a total N:total P$_2$O$_5$ weight ratio in the range from about 0.265 to about 0.335 in said melt; controlling the flow rate of said stream of heated orthophosphoric acid introduced into said enlarged pipe reactor to range from about 15 to about 200 pounds of P$_2$O$_5$ per hour per square inch of reactor internal cross sectional area; controlling the throughput per unit volume of said stream of heated orthophosphoric acid introduced into said enlarged pipe reactor to range from about 0.2 to about 3 pounds of $P_2O_5$ per hour per cubic inch of reactor internal volume, and wherein the thermal energy required to heat said ammonia and said orthophosphoric acid is extracted solely and entirely from the heat of ammoniation of said phosphoric acid.

2. The process of claim 1 wherein the melt formed in said enlarged diameter pipe reactor is withdrawn therefrom and introduced into dissolution means together with predetermined quantities of water to thereby produce improved ammonium polyphosphate suspensions containing from about 40 to about 47 percent total $N+P_2O_5$, said suspensions being initially substantially free of crystals therein until the temperature thereof is reduced to less than about 80° F. and said suspensions having a crystal coefficient value ranging upwards to about 0.4, said crystal coefficient value determined according to the following empirical relationship: crystal coefficient $= 48.64 + 0.001064$ (% total N plus % total $P_2O_5)^2 - 337.3$ (total N:total $P_2O_5$ wt ratio) $+ 563.5$ (total N:total $P_2O_5$ wt ratio)$^2$.

3. The product of the process of claim 2.

4. The process of claim 1 wherein the melt formed in said enlarged diameter pipe reactor is withdrawn therefrom and introduced into dissolution means together with predetermined quantities of water to thereby produce improved ammonium polyphosphate suspensions containing from about 41 to 46 percent total N+total $P_2O_5$, said suspensions being initially substantially free of crystals therein until the temperature thereof is reduced to less than about 80° F. and said suspensions having a crystal coefficient value ranging upwards to about 0.4, said crystal coefficient value determined according to the following empirical relationship: Crystal coefficient $= 48.64 + 0.001064$ (% total N plus % total $P_2O_5)^2 - 337.3$ (total N:total $P_2O_5$ weight ratio) $+ 563.5$ (total N:total $P_2O_5$ weight ratio)$^2$.

5. The process of claim 1 wherein dual reactors are used.

6. The process of claims 1 or 5 wherein reactors are cleaned with water or aqua ammonia.

7. The process of claims 1 or 5 wherein reactors are cleaned with feed wet-process acid.

8. A process for preparing improved ammonium polyphosphate melts eminently suitable for ultimately preparing fertilizer base suspensions, which melts are produced from wet-process orthophosphoric acid and ammonia, and which base suspensions have markedly improved low temperature storage characteristics, which process comprises supplying a stream of vaporized ammonia to an enlarged diameter pipe reactor; supplying a stream of heated wet-process orthophosphoric acid containing from about 50 to about 58 percent $P_2O_5$ to said enlarged pipe reactor; contacting said stream of ammonia with said stream of orthophosphoric acid at super atmospheric pressure and at temperatures in the range of about 420° F. to about 520° F. to form a resulting melt of ammonium polyphosphate wherein from about 15 to about 35 percent of the phosphorus values are converted to the nonortho acyclic species; controlling the flow rate of said stream of heated ammonia relative to the flow rate of said stream of heated orthophosphoric acid to maintain a total N:total $P_2O_5$ weight ratio in the range from about 0.27 to about 0.32 in said melt; controlling the flow rate of said stream of orthophosphoric acid introduced into said enlarged pipe reactor to range from about 15 to about 200 pounds of $P_2O_5$ per hour per square inch of reactor internal cross sectional area; controlling the throughput per unit volume of said stream of orthophosphoric acid introduced into said enlarged pipe reactor to range from about 0.2 to about 3 pounds of $P_2O_5$ per hour per cubic inch of reactor internal volume, and wherein said heat for the process is extracted solely and entirely from the heat of ammoniation of the phosphoric acid.

9. The process of claims 1 or 8 wherein said liquid anhydrous ammonia is vaporized and heated to temperatures ranging from about 70° F. to about 190° F. prior to its introduction into said enlarged diameter elongated reaction means and wherein said feed wet-process phosphoric acid is heated to temperatures ranging from about 80° F. to about 200° F. prior to its introduction into said enlarged diameter elongated reaction means.

* * * * *

UNITED STATES PATENT AND TRADEMARK OFFICE
CERTIFICATE OF CORRECTION

PATENT NO. : 4,337,079
DATED : June 29, 1982
INVENTOR(S) : Horace C. Mann, Jr., and Robert S. Meline It is certified that error appears in the above-identified patent and that said Letters Patent are hereby corrected as shown below:

Column 7, line 58, before "present" change "the" to -- be --
Column 14, line 37, after "Operating time without clogging" add -- hrs --
Columns 15 and 16, table VII, last line after "fertilizer" shift "22" to the first column of the table; shift each of the remaining numerals to the right one column.
Column 18, about line 23, in the second column of table VIII, opposite "Clay, % by wt" insert -- 2 --
Column 20, table IX, first line under "Test No." change "1b" to -- 1g --
Columns 21 and 22, table X, Test No. 9 was repeated.

Signed and Sealed this

Thirteenth Day of March 1984

[SEAL]

Attest:

GERALD J. MOSSINGHOFF

Attesting Officer    Commissioner of Patents and Trademarks